United States Patent [19]

Sherman et al.

[11] Patent Number: 4,630,671

[45] Date of Patent: Dec. 23, 1986

[54] LUNCH BOX

[76] Inventors: Victor Sherman, 13-10 34 Ave., Long Island City, N.Y. 11121; Ilya Zborovsky, 3285 Wolfson Dr., Baldwin, N.Y. 11510

[21] Appl. No.: 700,962

[22] Filed: Feb. 12, 1985

[51] Int. Cl.⁴ ............................................. F25B 29/00
[52] U.S. Cl. .................................... 165/61; 62/457; 206/545; 220/428
[58] Field of Search .................... 165/61, 101; 62/457; 206/545; 220/428; 126/261

[56] References Cited

U.S. PATENT DOCUMENTS

| | | | |
|---|---|---|---|
| 2,339,580 | 1/1944 | Park | 206/545 X |
| 2,504,132 | 4/1950 | Jones | 126/261 X |
| 2,504,911 | 4/1950 | Whitecar | 62/457 |
| 2,505,405 | 4/1950 | Jarboe | 126/261 X |
| 2,551,651 | 5/1951 | Vandewater | 165/61 X |
| 2,616,269 | 11/1952 | Reynolds | 165/61 X |
| 2,767,960 | 10/1956 | Fast | 165/61 X |
| 3,156,105 | 11/1964 | Bahner | 62/457 X |
| 3,387,650 | 6/1968 | Hoffmann et al. | 62/457 X |
| 3,406,532 | 10/1968 | Rownd et al. | 62/457 |
| 3,678,703 | 7/1972 | Cornish et al. | 62/457 X |
| 4,206,343 | 6/1980 | Mousel | 126/261 X |
| 4,213,310 | 7/1980 | Buss | 62/457 |
| 4,238,934 | 12/1980 | Hotta | 62/457 |
| 4,351,165 | 9/1982 | Gottsegen et al. | 62/457 X |

*Primary Examiner*—Lloyd L. King
*Attorney, Agent, or Firm*—Ilya Zborovsky

[57] ABSTRACT

A lunch box has a body, and a vessel filled with a freezable liquid so that the latter cools the interior of the body. Also heating element can be provided for heating the interiod of the body part.

1 Claim, 5 Drawing Figures

LUNCH BOX

BACKGROUND OF THE INVENTION

The present invention relates to a lunch box for carrying food, drinks etc for lunches and the like.

Lunch boxes of a general type are known in the art. Known lunch boxes are formed so that they have a body part arranged to accommodate food, drinks etc. However, they are not suitable to keep their contents in cooled conditon during hot weather to prevent spoiling of food. They are also not suitable to heat their contents if desired by a user.

SUMMARY OF THE INVENTION

Accordingly, it is an object of the present invention to provide a lunch box which avoids the disadvantages of prior art.

In keeping with these objects and with others which will become apparent hereinafter, one feature of the present invention resides, broefly stated, in a lunch box which is provided in its body with a freezable liquid and therefore can cool the interior of the body of the box.

Another feature of the present invention is to provide a lunch box which has a heating element in its interior so that the interior of the box and therefore food, drinks and the like located in it can be heated by a user.

The novel features of the present invention are set forth in particular in the appended claims. The invention itself, however, will be best understood from the following description of a preferred embodiment which is accompanied by the following drawing.

DESCRIPTION OF PREFERRED EMBODIMENTS

Figure 1:
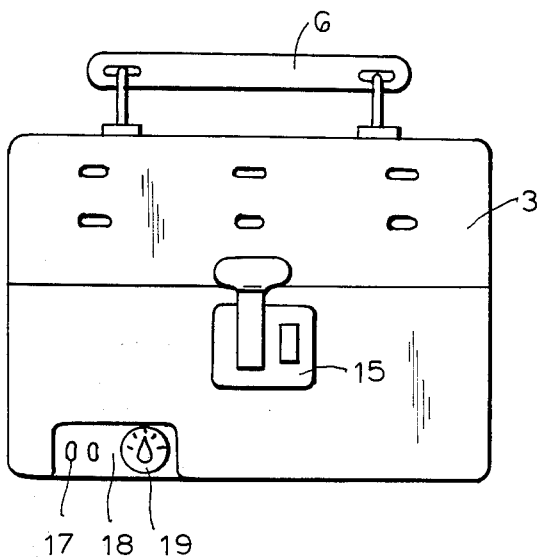
FIG. 1 is a front view of a lunch box in accordance with the present invention in a closed position.
Figure 2:
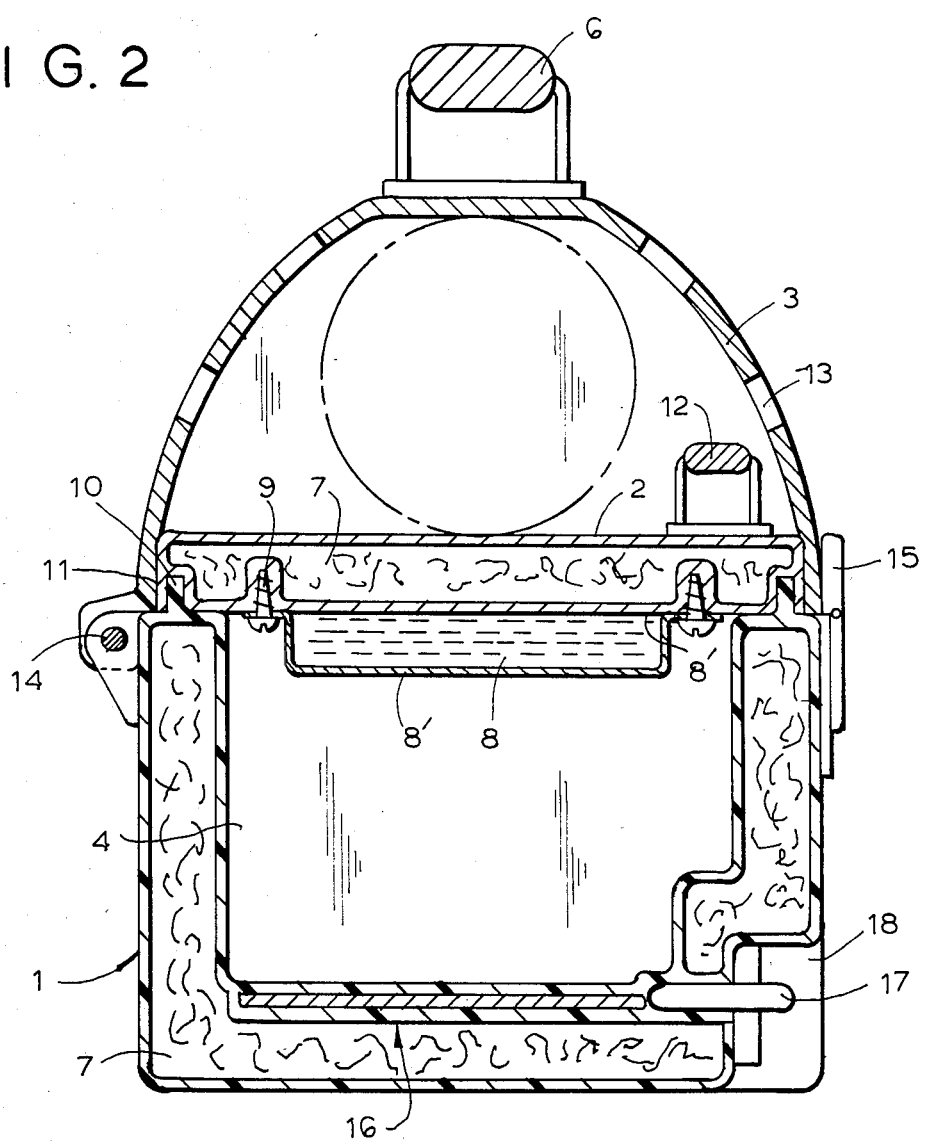
FIG. 2 is a view showing a section of the inventive lunch box in accordance with one embodiment.

As can be seen from FIGS. 1 and 2, a lunch box has a body including a main part 1 and a cover 2. An additional cover 3 is further provided. An inner chamber 4 is formed between the main part 1 and the cover 2, and an additional inner chamber 5 is formed between the cover 2 and the additional cover 3. The chamber 4 serves substantially for accommodating food, drinks etc to be preserved in cool condition, whereas the chamber 5 serves for preserving the same for example in theremosis which is shown in dash-dot lines. The additional cover 3 has a handle 6.

The main part 1 and the cover 2 are double-walled and provided with a heat insulation 7 of any known material inside spaces formed between their double walls. As can be seen from FIGS. 2-4, a vessel 8 is further provided with a freezable liquid, such as for instance water, an aqueaous solution of salt for example sodium chloride, organic liquid for example alcohol, ethylene glycols etc. When the frezable liquid is sufficiently cooled or froozen and the vessel is inserted into the chamber 4, food, drinks etc container in the chamber are cooled and kept in cool condition.

As can be seen from the drawing, the vessel 8 is mounted on one side of the cover 2. In FIG. 2, the vessel 8 has two walls 8' which can be connected with one another for example by welding, and the vessel 8 as a whole is mountable on the cover 2 for example by screws 9 screwable into the holes provided in the cover 2 and in the vessel 8. An important feature of the invention is that the cover 7 is mounted on the main part 1 removable, for example with the aid of pins 10 provided on the main part 1 and holes 11 provided in the cover 2. Therefore the cover 2 can be attached to the main part 1 by snapping of the holes onto the pins. The pins can have a thicked upper edge so as to improve the holding action, and the areas of the cover which have the holes or the cover as a whole can be somewhat yieldable so as to allow fitting the holes onto the pins for mounting the cover and also the removal of the cover.

The vessel 8 is mounted on the cover 2 in its central part, so that a peripheral part of the cover remains free and serves as a grasping part to be grasped by a user. Since after certain period of use the liquid in the vessel melts the vessel must be brought into contact with a freezing element for example put on a cold part in a refrigerator, or just inserted into a cold space for example in a refrigerator. It is very convenient to do so in the inventive lunch box since a user can remove the cover from the main part 1 and put it to the freezing element by its upper side provided with the vessel 8 facing downwardly. During this, the user holds the cover by its free peripheral region. An additional handle 12 is provided on the cover 7 for holding during removal of the cover and during placing it back onto the main part.

As can be seen from FIG. 2, the vessel 8 is mounted on one side of the cover and separated from its opposite side by the layer of insulation. Therefore, the chamber 4 is substantially tightly closed from the surrounding atmosphere to prevent its warming, and particularly it is insulated from the chamber 5. Since the chamber 5 accommodates a theremosis and the like for storing warm or hot drinks heat is generated by the latter and its passage into the chamber 4 is prevented by the layer of insulation. The cover 3 is provided with a plurality of perforations so as to allow the heat generated inside the chamber 5 to dissipate outward;y of the lunch box.

The cover 3 is pivotally mounted on the main part 1 by a pivot axle 14 and is locable with or unlockable from the main part by a known lock 15. In the locked position the cover 3 surrounds both the main part 1 and the cover 2. The cover 3 abuts with its right lower end against the upper surface of the main part 1 and the right end surface of the cover 2 to provide the tightness.

A heating element 16 is further provided in the bottom of the box. It can be formed for example of a resistant type as a wire, a plate etc. and connected with the bottom such as molded in it, preferably in its upper wall. It is to be understood that the vessel 8 and the heating element 16 can be arranged on different walls of the box, but the described arrangement is preferable. Plugs 17 extend from the heating element 16 and can be connected for example by an extension cord to an electrical source such as an electrical network. It is to be understood that the heating element 16 can also be heated from batteries. The plugs 16 are located inside a depression 18 in the main part 1 so as not to extend outwardly beyond the main part's outer contour. A temperature control device 19 is identified with reference numeral 19. It can be of a known type for example of bimettal, thermistor or any other type. When the heating element 16 is heated, it heats the chamber 4 and food, drinks etc located in the latter.

Figure 3:
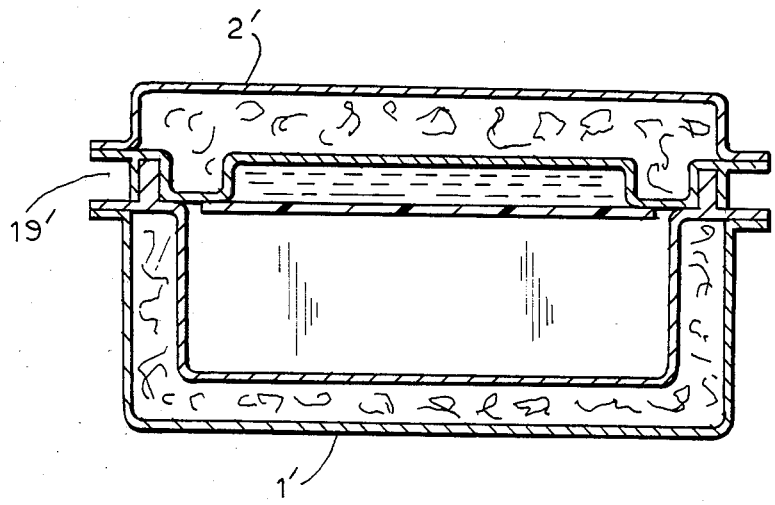
FIG. 3 is a view showing a section of the lunch box in accordance with another embodiment of the invention.

As can be seen from FIG. 3, the lunch box can be formed without the cover 3. It is very compact. Its main part 1' and cover 2' are each formed of two shells which contain insulation therebetween and are connected with each other along their contour by welding. The shells can be composed of plastics. A space 19 is retained between the peripheral edges of the main part and the cover so as to expose the edge of the cover for grasping by a user for removal and putting back purposes. The vessel here is formd by the lower shall of the cover 2' and a single wall 8'' connected with one another for example by welding. The vessel is thus received in the interior of the cover since the lower wall of the cover is depressed inwardly of the latter.

Figure 4:
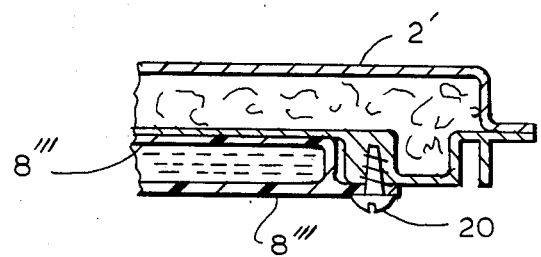
FIGS. 4 and 5 are views showing two further embodiments of a vessel with a freezable liquid in accordance with the invention.
Figure 5:
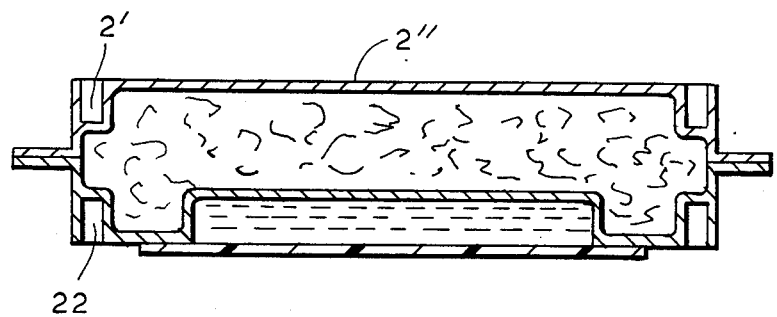

The vessel shown in FIG. 4 is also located in a depression of the cover 2', but is formed as a separate element insertable into the cover depression and connected with the cover by screws 20. A cover 2'' shown in FIG. 5 is suitable for the box of FIG. 2. It has two sets of holes 21 and 22 formed at opposite sides of the cover and all fittable onto the pins 10. When the cover is arranged with the vessel 8 facing downwardly, the holes 22 are fitted onto the pins 10 and the chamber 4 can be cooled by the frozen liquid in the vessel 8. When however it is necessary to heat the interior of the chamber 4 by the heating element, the cover is turned upside down, the holes 21 are fitted onto the pins 10, and the vessel 8 faces upwardly and is separated from the chamber 4 by the layer of insulation in the cover. Thus the heating element heats the chamber 4 without substantially acting upon the vessel 8 with its frozen liquid.

The vessel can be mounted on another part of the box, which can be turnable so that the vessel carried by this part faces toward the chamber 4 to cool the latter, or faces away from the chamber 4 to allow warming the latter by the heating element.

The invention is not limited to the details shown since various modifications and structural changes are possible without departing in any way from the spirit of the present invention.

What is desired to be protected by Letters Patent is set forth in particular in the appended claims.

We claim:
1. A lunch box, comprising
a hollow body bounding an inner substantially closed chamber for accommodating food;
a hollow vessel removably attached to a part of said body so as to be located in said inner chamber when it is attached, and filled with a liquid which can be frozen and thereby cools said inner chamber; and
an electrical heating element connected with said hollow body and connectable with an electric power source so as to be heated and to supply heat into said inner chamber for accommodating food contained in said inner chamber for accommodating food, and disconnectable from an electric power source so as to be deactuated for cooling said inner chamber by said liquid-filled vessel,
said liquid-filled vessel being mounted in said inner chamber so as to be movable between a first position in which it faces toward said inner chamber for cooling the latter, and a second position in which it faces away of said inner chamber and therefore said heating element so that when said heating element heats said inner chamber said vessel is less subjected to the action of heat from said heating element.

* * * * *